(12) United States Patent
Ferguson

(10) Patent No.: US 8,781,503 B2
(45) Date of Patent: Jul. 15, 2014

(54) SYSTEM AND METHOD FOR EXTRACTION OF LOCATION RELATED DATA IN A WIRELESS COMMUNICATION SYSTEM

(75) Inventor: Jeffrey D. Ferguson, Monroe, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 1390 days.

(21) Appl. No.: 12/046,296

(22) Filed: Mar. 11, 2008

(65) Prior Publication Data

US 2009/0233625 A1    Sep. 17, 2009

(51) Int. Cl.
*H04W 24/00* (2009.01)
(52) U.S. Cl.
USPC .............. 455/456.5; 455/456.3; 455/414.1; 455/456.1
(58) Field of Classification Search
USPC .............. 455/456.5, 414.1, 456.1, 456.3
See application file for complete search history.

(56) References Cited

U.S. PATENT DOCUMENTS

| | | | | |
|---|---|---|---|---|
| 2003/0087647 | A1* | 5/2003 | Hurst | 455/456 |
| 2007/0123215 | A1* | 5/2007 | Wang et al. | 455/411 |
| 2008/0153512 | A1* | 6/2008 | Kale et al. | 455/456.3 |
| 2008/0261614 | A1* | 10/2008 | Mia et al. | 455/456.1 |
| 2010/0265068 | A1* | 10/2010 | Brackmann et al. | 340/572.1 |

* cited by examiner

*Primary Examiner* — Justin Lee
(74) *Attorney, Agent, or Firm* — Parks IP Law LLC; Jennifer P. Medlin, Esq.

(57) ABSTRACT

A system and method to collect data related to the geographical location of a mobile station communicating with a GSM network and to use the location related data to determine the geographical location of the mobile station. A tap is place in an Abis link between a base station and a base station controller, the tap providing a copy of a signal carried by the Abis link. The copy signal is routed to a protocol analyzer that extracts location related data from the copy signal. A location processor uses the location data to determine the geographical location of the mobile station. The geographical location data is used by a data analyzer to provide location based services, such as estimating traffic intensity and speed of mobile stations.

15 Claims, 4 Drawing Sheets

SYSTEM AND METHOD FOR EXTRACTION OF LOCATION RELATED DATA IN A WIRELESS COMMUNICATION SYSTEM

BACKGROUND OF THE INVENTION

1. Field of the Invention

The present invention is directed generally to mobile wireless communication services. More particularly, the present invention is directed to a system and method for collecting data for location based services.

2. Description of the Related Art

Operators of wireless networks for mobile devices have developed several methods for determining the geographical location of a mobile station. Some methods measure the Time Difference of Arrival (TDOA) or Angle of Arrival (AOA) of a signal transmitted by a mobile station and received at multiple base stations, then use geometric algorithms to determine the location of the mobile station. However, TDOA and AOA require additional equipment to be installed and maintained at many base stations. Some methods use a Global Positioning System (GPS) receiver in each mobile station to report the position of that mobile station to the network. This has the disadvantage that it requires additional equipment in every mobile station. Additionally, GPS does not work well in some situations, particularly in urban areas where large buildings block the satellite signals.

Some methods use Received Signal Strength Indication (RSSI) measurements. Many types of mobile stations regularly make RSSI measurements of control signals from nearby base stations and send the measurements to a Mobile Switching Center (MSC) to ensure that the mobile station is connected to the network through the best available base station. Selected RSSI measurements are then routed by the MSC over a Lb link to a mobile location module (MLM) which uses the selected RSSI measurements to determine mobile station location. This method is adequate for infrequent use such as 911 calls and requests by users of mobile stations for their location. However, it does not work well with widespread use. If the network operator wants to track the location of a large number of mobile stations simultaneously and continuously, the amount of information processing could overwhelm the BSC and MSC, adversely affecting the network's ability to route voice and data traffic. Additionally, the system would need a large bandwidth connection between the MSC and MLM to handle the continuous flow of requests and measurements. What is needed is a system and method to obtain the measurements required for determining the location of a large number of mobile stations continuously without overburdening the mobile wireless network and impeding its ability to route voice and data traffic. The present invention provides this advantage and other advantages as will be apparent from the following detailed description and accompanying figures.

DETAILED DESCRIPTION OF THE INVENTION

Figure 1:
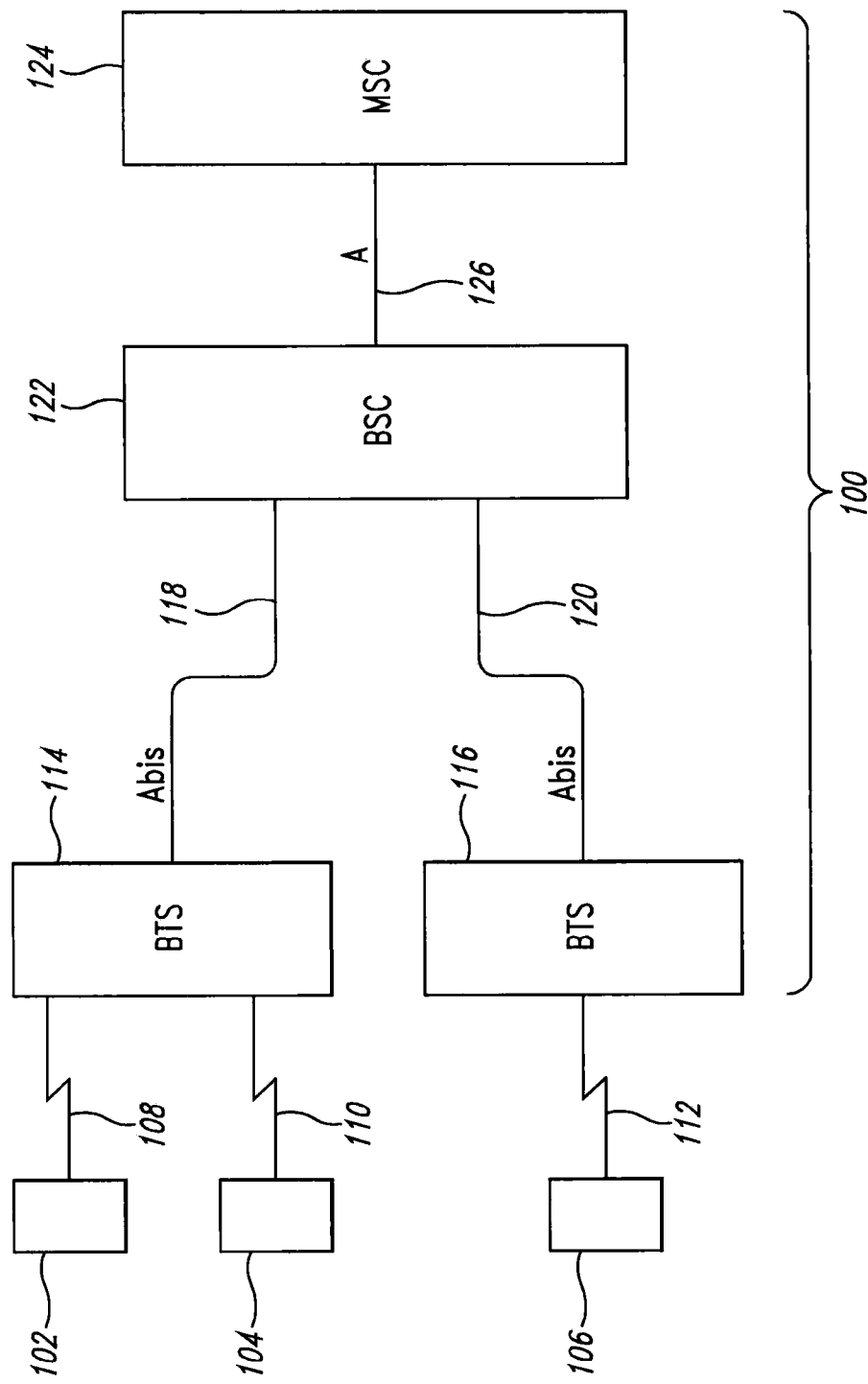
FIG. 1 shows a portion of a typical conventional GSM network and several mobile stations served by the GSM network.

FIG. 1 shows a portion of a typical known GSM network 100 and mobile stations 102, 104, and 106 served by the GSM network. The mobile stations 102, 104, and 106 are connected to the GSM network 100 via wireless communication links 108, 110, and 112. Base stations (BTSs) 114 and 116 connect with the mobile stations 102, 104, and 106 over the wireless communication links 108, 110, and 112, respectively. A base station controller (BSC) 122 connects to the base stations 114, and 116 through communication links 118 and 120, respectively. Communication links 118 and 120 comply with the GSM "Abis" interface standard. A mobile switching center (MSC) 124 connects to base station controller 122 through communication link 126. Communication link 126 complies with the GSM "A" interface standard.

The mobile stations 102, 104, and 106 are configured to engage in voice and/or data communication over the wireless communication links 108, 110, and 112. These voice and data communications are carried on traffic channels using known methods through the GSM network 100. The base stations 114 and 116 are each associated with at least one control channel that is used to set up and maintain communications with mobile stations 102, 104, and 106.

The control channel information includes reports of measurements recently made by the mobile stations 102, 104, and 106. The measurement report from a particular mobile station includes measurements of the received signal strengths of the control channels associated with each of the base stations 114, and 116 that are currently in range of that mobile station. Such a measurement is commonly referred to as a received signal strength indication (RSSI). The measurement reports include the identity of the mobile station making the measurements, a set of RSSI measurements and for each RSSI measurement, the identity of the base station with which it is associated.

Each of the Abis links 118 and 120 carry traffic channels and control channels between their base stations 114 and 116 and the base station controller 112. The Abis links 118 and 120 may comply with the DS-1, DS-3, OC-3 or other data link layer standards allowed by the Abis interface standard.

Figure 2:
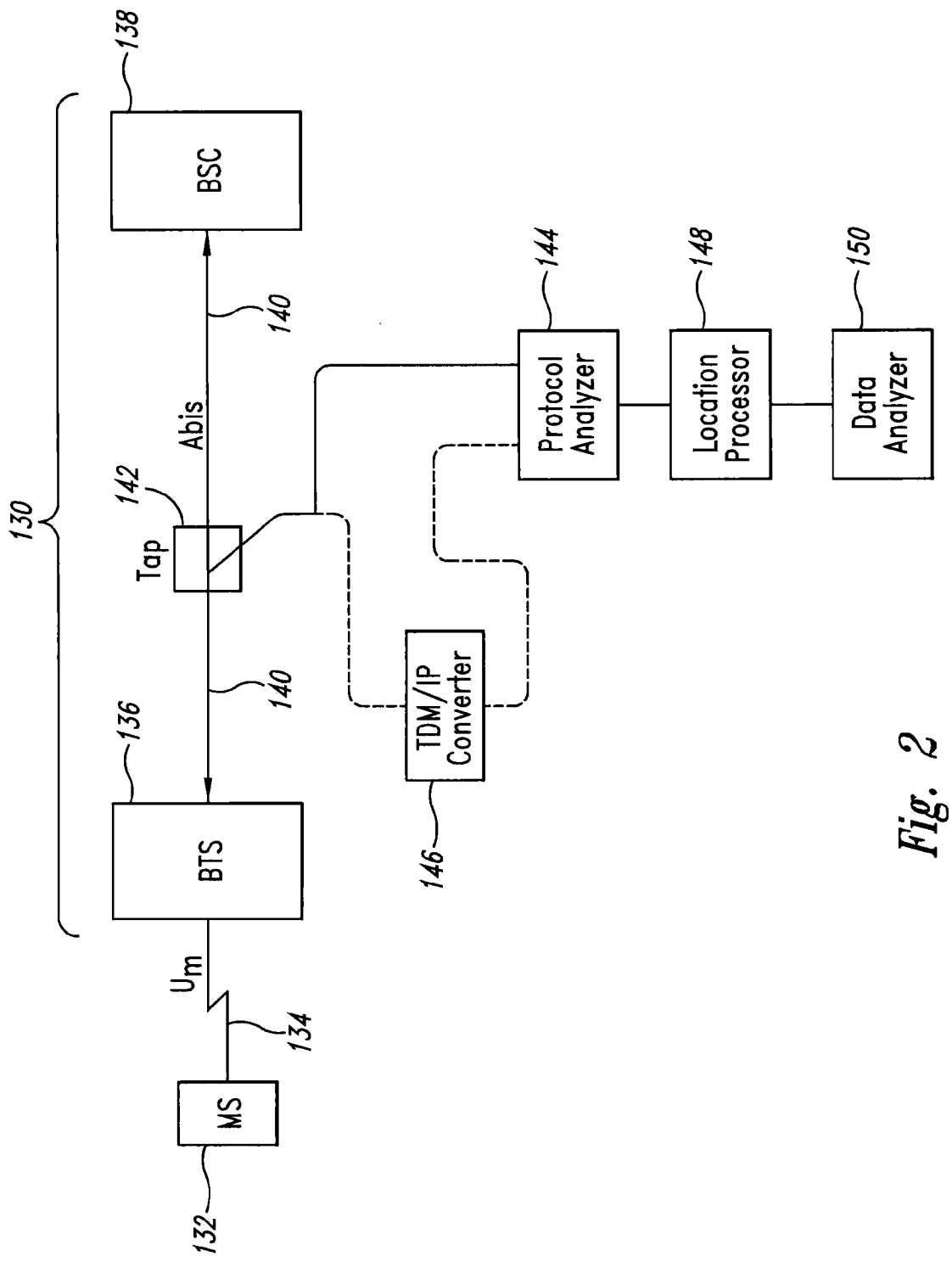
FIG. 2 shows a mobile station in communication with a GSM network with additional elements to collect mobile station measurements from an Abis link and use the measurements to determine the mobile station location.

FIG. 2 shows a mobile station 132 in communication with a GSM network 130 that has additional elements that collect mobile station measurements from an Abis link 140 and use the measurements to determine the mobile station location. A BTS 136 of the network 130 communicates with the mobile station 132 over a wireless communication link 134. The BTS 136 communicates with a BSC 138 through the Abis link 140. As illustrated in FIG. 2, a tap 142 is placed in the Abis link 140. The Abis link 140 carries a signal that includes traffic channels from the base station 136 as well as control channels. The tap 142 is configured to provide a copy of the signal transmitted on the Abis link 140. The tap 142 sends the copy of the signal to a protocol analyzer 144. The tap 142 is configured so that the tap does not substantially alter the signal on the Abis link 140 and does not interfere with the normal flow of data on the traffic channel and the control channel from the base station 136 to the base station controller 138. In some embodiments, the tap 142 regenerates the signal in the process of providing a copy. In other embodiments, the tap 142 splits off an insignificant amount of energy from the signal.

In some embodiments, a protocol converter 146 is placed between the tap 142 and the protocol analyzer 144. The protocol converter 146 is configured to convert the protocol of the copied signal from time domain multiplexing (TDM) to internet protocol (IP). Whether a protocol converter 146 is used would be determined by the type of interfaces available for the protocol analyzer 144. Generally, TDM interfaces for the protocol analyzer 144 are more expensive and less readily available than IP (Ethernet) interfaces.

The protocol analyzer 144 is configured to extract data from the copy of the signal that is related to the location of the mobile station 132. Such location-related data may include directly related data, defined as information directly indicating the geographic location of the mobile station 132, such as GPS coordinates or a street address. Location-related data can also include indirectly related data that, while not directly indicating the geographic location of the mobile station 132, can be used to calculate the location. For example, sets of RSSI data can be used to calculate an estimated location of the mobile station 132. The protocol analyzer 144 includes one or more probes. Each probe is configured to examine the copy of the signal, watching for a specific data field in the signal known to contain location-related data. The probe is configured to identify such a data field and extract the contents. The protocol analyzer 144 is configured to send the extracted location-related data to a location processor 148.

The location processor 148 is configured to use the location-related data to determine location data. Location data is defined as information directly indicating the geographic location of a mobile station 132. If the location-related data is directly related data, such as GPS coordinates, the location processor 148 is configured to consider the location-related data as location data. If the location-related data is indirectly related data, such as RSSI data, then the location processor 148 is configured to use an algorithm to convert the location-related data into location data. The location processor 148 is configured to pass the location data to a data analyzer 150.

Operation of the location processor 148 is well known in the art and need not be described in greater detail herein. For example, U.S. Patent Publication No. 2004/015247, assigned to the assignee of the present application, describes techniques for deriving location data from RSSI data. Other techniques may be satisfactorily employed to implement the location processor 148. The present invention is not limited by the specific technique used to derive the location data.

The data analyzer 150 is configured to analyze the location data and provide location-based services. In some embodiments, the data analyzer 150 is configured to store the location data. There are many different ways the data analyzer 150 can analyze the location data and provide location based services. For example, the data analyzer 150 can aggregate the location data to determine the number of mobile stations in a given geographical area. The data analyzer 150 can perform statistical modeling of the location data of the mobile stations moving through a geographical area. Slower moving mobile stations can be filtered out so that vehicular traffic patterns can be modeled. In an exemplary embodiment, traffic patterns can be matched with street maps to provide navigation data.

In some embodiments, the protocol analyzer 144, the location processor 148, and the data analyzer 150 are discrete devices linked by communication links, as shown in FIG. 2. In other embodiments, the protocol analyzer 144, the location processor 148, and the data analyzer 150 are software modules executed on a data collection server. In yet other embodiments, one of these three devices is a discrete device and the other two are software modules executed on a data collection server.

Figure 3:
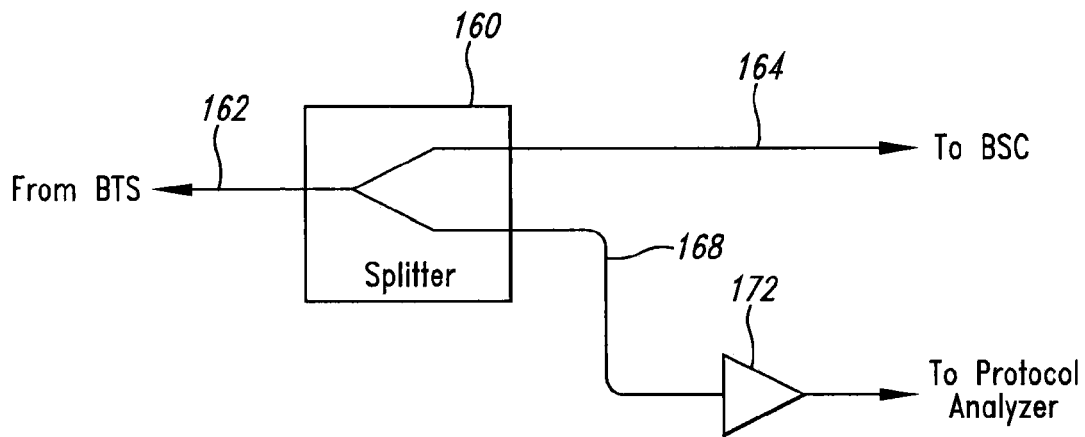
FIG. 3 shows an exemplary embodiment of a tap that may be used in the system of FIG. 2.

FIG. 3 shows the tap 142 (see FIG. 2) implemented as a splitter 160 in the Abis link 140 between the base station 136 and base station controller 138. The splitter 160 is placed in the Abis link 140 dividing the Abis link into a pre-splitter link 162 and a post-splitter Abis link 164. The splitter 160 physically divides the signal arriving on the pre-splitter Abis link 162 into a continuing portion (i.e., the post-splitter Abis Link 164) and a copy portion carried on link 168. The post-splitter Abis link 164 continues on to the base station controller 136 without any interruption or serious degradation of signal quality. The copy portion of the signal is routed on link 168 to the protocol analyzer 144. In some embodiments, the splitter 160 routes most of the signal energy into the post-splitter Abis link 164, and routes only a small fraction of the original signal energy into link 168. In other embodiments, the signal energy is divided evenly between the post-splitter Abis 164 link and link 168 or divided in some other ratio. In some embodiments, an amplifier 172 is placed in line with the copy portion on link 168 to increase the strength of the signal copy before it reaches the protocol analyzer 144. In some embodiments, the Abis link 162 comprises an electrical wire, in which case the splitter 160 is an electrical splitter. In some embodiments, the Abis link 162 comprises an optical fiber, in which case the splitter 160 is an optical splitter.

Figure 4:
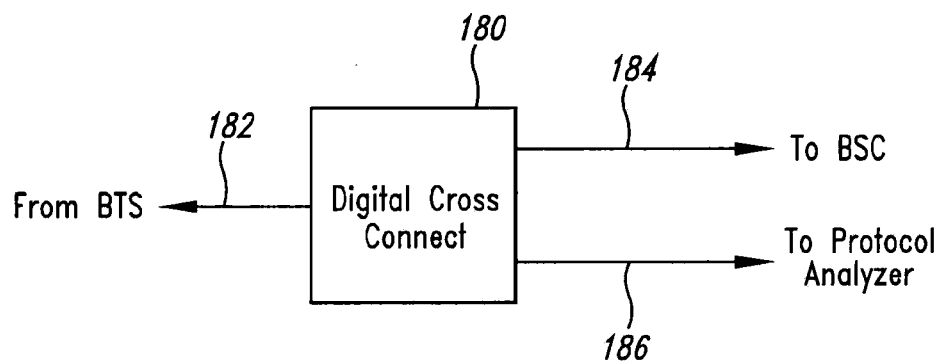
FIG. 4 shows another exemplary embodiment of a tap that may be used in the system of FIG. 2.

FIG. 4 shows the tap 142 (see FIG. 2) implemented as a digital cross-connect. The operation of digital cross-connects is well-known. In the present system, the digital cross-connection 180 is configured to receive Abis link 182 from the base station 136 (See FIG. 2). The digital cross-connect 180 is configured to regenerate the signal and forward the regenerated signal on link 184 to the BSC 138. In the process of regenerating the signal, the digital cross-connect 180 is configured to generate a copy of the signal and send it out on link 186 to the protocol analyzer 144 (See FIG. 2). Since both the signals on the link 184 to the BSC 138 and link 186 to the protocol analyzer 144 are newly generated (or regenerated) signals, no further amplification is required. In some embodiments, the digital cross-connect 180 can generate a groomed copy signal by analyzing the copy signal into component channels, and then excluding channels that do not contain data related to the location of a mobile station. The advantage of a groomed copy signal is that most of the traffic channels would be eliminated, so link 186 to the protocol analyzer 144 requires less bandwidth, and the protocol analyzer has less information to analyze.

Figure 5:
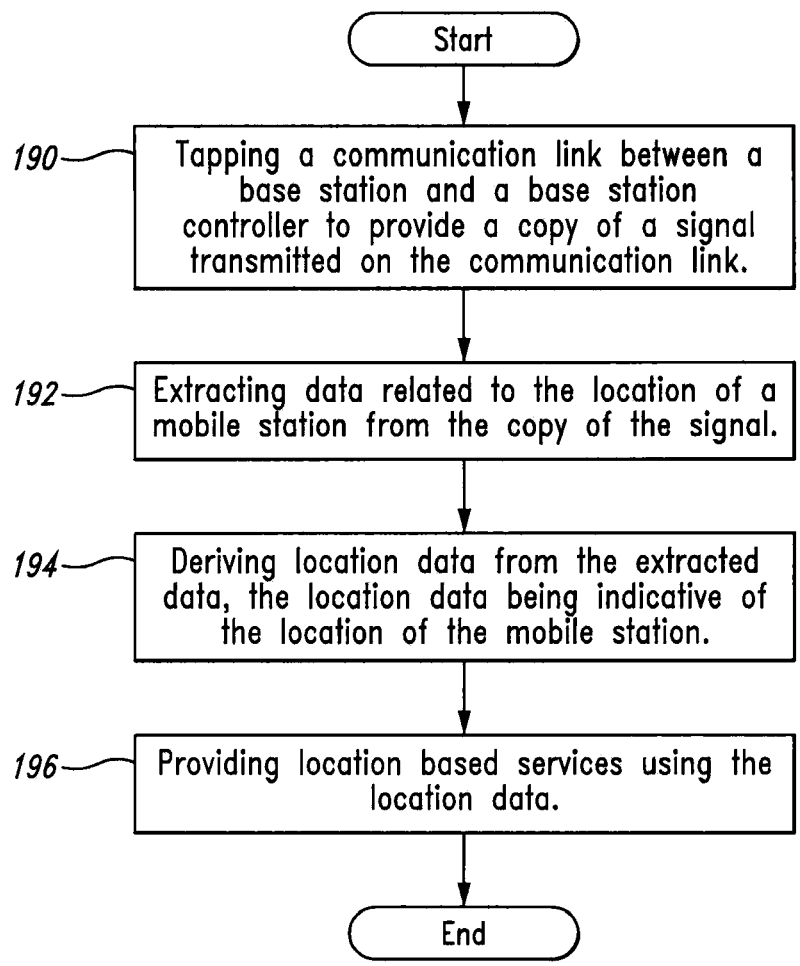
FIG. 5 shows a flowchart of a method to determine the location of mobile stations in communication with a base station of a network.

FIG. 5 shows a flowchart of a method to determine the location of mobile stations in communication with a base station of a network. Step 190 comprises tapping the communications link to provide a copy of a signal transmitted on a communications link between the base station and a base station controller. In some embodiments tapping the communications link is performed by physically splitting the signal on the communications link into at least two portions. One of the portions continues on to the base station controller, and the other portion, designated as a copy signal, is diverted for further processing. In other embodiments, tapping the communications link includes the steps of receiving the signal, regenerating the signal, and generating a copy of the signal. The regenerated signal is routed to the base station controller and the generated copy is diverted for further processing. In some embodiments the generated copy of the signal is analyzed into component channels. Component channels not containing data related to the location of one of the mobile stations are excluded from the generated copy.

Step 192 comprises extracting data from a copy of the signal. The extracted data is related to the location of a mobile station. This location-related data may be directly or indirectly related. Directly related data, such as geographical coordinates, is data that directly indicates the geographic location of one of the mobile stations. Indirectly related data is data that can be used to derive the geographical location of one of the mobile stations. The location-related data may be extracted by identifying one or more data fields in the copy of the signal known to contain location-related data. For example, certain fields in the copy of the signal may be known as containing RSSI measurement sets. Other fields in the copy of the signal may be known as containing GPS data.

Step 194 comprises deriving location data from the extracted data. Location data is defined as information directly indicating the geographic location of a mobile station. If the extracted data is directly related data, such as GPS coordinates, then the extracted location related data can simply be considered location data. If the extracted data is indirectly related data, such as sets of RSSI measurements, then an algorithm may be used to determine the location data. U.S. Patent Publication Number 2004/015247 describes several such algorithms. One algorithm uses RSSI measurements and a propagation loss model to determine the distance of a mobile station from each of several base stations. Geometric triangulation of the distances can then determine the location of the mobile station. Another algorithm matches a set of RSSI measurements made by the mobile station with the closest entry in a table of previously determined RSSI values, each entry in the table having corresponding location data. Yet another algorithm receives GPS measurements made by the mobile station, then verifies the accuracy using RSSI values and one or more of the RSSI related location algorithms. Other known techniques to determine location data for a mobile station can be readily used.

Step 196 comprises providing location-based services using the location data. Location-based services may be provided to the user, or to an operator of the network or to some other party. Many different location-based services may provided. For one example, the location data may be used to determine the number of mobile stations in a given geographical area. In another example, the location data may be used to provide a statistical model of mobile stations moving through a geographical area. In another example, traffic patterns can be modeled and the traffic patterns matched with street maps to provide enhanced navigation data. In another example, information about restaurants or other businesses near the current location of the mobile station may be provided to the user of the mobile station. The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A system to provide location-based services for a mobile station in communication with a base station, the base station communicating with a base station controller via a communication link, comprising:

a protocol analyzer for extracting data from a copy of a signal provided by a tap on the communication link between the base station and the base station controller, the extracted data related to a location of the mobile station, wherein the extracted data includes contents of one or more specific data fields in the copy of the signal, and wherein the protocol analyzer further comprises one or more probes, each probe configured to filter out the contents of a specific data field in the copy of the signal; and a location processor for receiving the extracted data and deriving location data therefrom, the location data being indicative of the location of the mobile station, wherein the extracted data comprises received signal strength indication measurement sets related to the location of the mobile station associated with the base station, each set including received signal strength indications measured by the mobile station of control signals from base stations within range of the mobile station, and wherein the location processor derives location data from the extracted data by:

comparing one of the received signal strength indication measurement sets with a database of predetermined received signal strength indication measurement sets associated with geographical location data and selecting as the derived location data the geographical location data associated with the predetermined received signal strength indication measurement set that most closely matches the one received signal strength indication measurement set; or determining distances from the mobile station to base stations within range of the mobile station using one of the received signal strength indication measurement sets and an algorithm based on a radio frequency propagation model and determining the derived location data by triangulation using the determined distances and data relating to the geographical locations of the base stations.

2. The system of claim 1 wherein the tap is a physical tap of the communication link for providing the copy of the signal by splitting the signal.

3. The system of claim 1 wherein the tap is a digital cross connect for receiving the signal, regenerating the signal, and generating the copy of the signal.

4. The system of claim 1 wherein the communication link is constructed in conformance with an industry standard for an Abis interface.

5. The system of claim 1 wherein the communication link is an electrical link, the signal is an electrical signal and the tap is an electrical tap.

6. The system of claim 1 wherein the communication link is an optical link, signal is an optical signal and the tap is an optical tap.

7. The system of claim 1 wherein the extracted data comprises Global Positioning System (GPS) data related to the location of the mobile station associated with the base station.

8. The system of claim 1, further comprising a data analyzer for processing the location data and providing location based services.

9. The system of claim 8 wherein the data analyzer performs statistical modeling of vehicular traffic through a geographic area covered by the base station, the modeling based on the derived mobile station location data.

10. The system of claim 1 wherein the extracted data comprises Global Positioning System (GPS) data related to the location of the mobile station associated with the base station.

11. A method to provide location-based services for a mobile station in communication with a base station, the base station communicating with a base station controller via a communication link, comprising:

extracting data from a copy of a signal provided by a tap on the communication link between the base station and the base station controller, the data extracted related to a location of the mobile station, and deriving location data therefrom, wherein extracting data from the copy of the signal comprises identifying one or more data fields in the copy of the signal, the data fields containing contents related to the location of the mobile station and extracting the contents of one or more identified data fields, wherein the extracted data comprises received signal strength indication measurement sets related to the location of the mobile station associated with the base station, each set including the received signal strength indications measured by the mobile station of control signals from base stations within range of the mobile station, and wherein deriving location data from the extracted data comprises:

comparing one of the received signal strength indication measurement sets with a database of predetermined received signal strength indication measurement sets associated with geographical location data and selecting as the derived location data the geographical location data associated with the predetermined received signal strength indication measurement set that most closely matches the one received signal strength indication measurement set; or determining distances from the mobile station to base stations within range of the mobile station using one of the received signal strength indication measurement sets and an algorithm based on a radio frequency propagation model and determining the derived location data by triangulation using the determined distances and data relating to the geographical locations of the base stations.

12. The method of claim 11 wherein the copy of the signal is provided by the tap physically splitting the signal into at least two portions including the copy of the signal and a continuing portion of the signal.

13. The method of claim 11 wherein the copy of the signal is provided by the tap:

receiving the signal;

regenerating the signal; and generating the copy of the signal.

14. The method of claim 13 wherein generating the copy of the signal comprises:

analyzing the signal into component channels;

excluding channels from the copy of the signal, the excluded channels not containing information related to the location of the mobile station.

15. The method of claim 11 further comprising providing location based services using the location data.

* * * * *